United States Patent
Konaka et al.

(10) Patent No.: US 6,786,094 B2
(45) Date of Patent: Sep. 7, 2004

(54) PROCESS OF MAKING AN ACCELERATION DETECTING ELEMENT

(75) Inventors: Yoshihiro Konaka, Sagamihara (JP); Takahiro Oguchi, Sagamihara (JP); Teruhisa Shibahara, Sagamihara (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 45 days.

(21) Appl. No.: 09/846,861

(22) Filed: May 1, 2001

(65) Prior Publication Data

US 2001/0037682 A1 Nov. 8, 2001

(30) Foreign Application Priority Data

May 2, 2000 (JP) ........................................ 2000-133500

(51) Int. Cl.[7] ................................................ G01P 9/04
(52) U.S. Cl. .................................................. 73/504.14
(58) Field of Search .......................... 73/504.04, 504.02, 73/504.12, 504.13, 504.14, 504.15, 504.16, 514.32

(56) References Cited

U.S. PATENT DOCUMENTS

| | | | | |
|---|---|---|---|---|
| 5,945,599 A | * | 8/1999 | Fujiyoshi et al. | ........ 73/504.12 |
| 5,992,233 A | | 11/1999 | Clark | |
| 6,044,707 A | * | 4/2000 | Kato | ........................ 73/504.14 |
| 6,122,962 A | * | 9/2000 | Yoshino et al. | ........... 73/504.14 |
| 6,134,961 A | * | 10/2000 | Touge et al. | ............. 73/504.12 |
| 6,240,780 B1 | * | 6/2001 | Negoro et al. | ........... 73/504.12 |
| 6,301,963 B1 | * | 10/2001 | Park | ........................ 73/504.12 |
| 6,539,803 B2 | * | 4/2003 | Mochida | .................. 73/504.12 |
| 2001/0004847 A1 | * | 6/2001 | Moriya et al. | ........... 73/504.12 |

FOREIGN PATENT DOCUMENTS

| | | |
|---|---|---|
| JP | 8-178667 | 7/1996 |
| JP | 11-044541 | 2/1999 |
| JP | 2000-105125 | 4/2000 |
| JP | 2001-304872 | 10/2001 |

* cited by examiner

*Primary Examiner*—Helen Kwok
(74) *Attorney, Agent, or Firm*—Keating & Bennett, LLP

(57) ABSTRACT

A vibrator includes: a vibrating body; a driving unit for causing the vibrating body to vibrate in a predetermined vibrating direction; and a driving monitoring unit for detecting vibration displacement in a driving direction of the vibrating body. Stabilization of vibration in the driving direction of the vibrating body is achieved by applying positive feedback control to the driving unit based on the state of the vibration displacement in the driving direction of the vibrating body detected by this driving monitoring unit. The driving monitoring unit is constructed and arranged so as to be provided in a barycentric region of the vibrating body to detect the vibration displacement in the driving direction of the barycentric region of the vibrating body.

5 Claims, 7 Drawing Sheets

PROCESS OF MAKING AN ACCELERATION DETECTING ELEMENT

BACKGROUND OF THE INVENTION

1. Field of the Invention

The present invention relates to a vibrator used for an angular velocity sensor or the like.

2. Description of the Related Art

FIG. 4 illustrates a plan view of a conventional vibrator 2 constituting a conventional angular velocity sensor 1. The vibrator 2 of the angular velocity sensor 1 shown in FIG. 4 includes a substrate 3 in which a support fixed unit 4, comb-shaped driving fixed electrode units 5 (5a, 5b, 5c, 5d, 5e, 5f, 5g, 5h) and detecting fixed electrode units 6 (6a, 6b, 6c, 6d, 6e, 6f) are each disposed in a fixed manner on the top face thereof. A vibrating body 8 is connected to the support fixed unit 4 via support units 7 (7a, 7b).

The vibrating body 8 is spaced from the substrate 3, is disposed so that it can vibrate, and is constructed by including driving beams 9 (9a, 9b, 9c, 9d), an outer frame 10, comb-shaped driving movable electrode units 11 (11a, 11b, 11c, 11d, 11e, 11f, 11g, 11h), support units 12 (12a, 12b), detecting beams 13 (13a, 13b, 13c, 13d) that are coupling beams, an inner frame 14, and comb-shaped detecting moveable electrode units 15 (15a, 15b, 15c, 15d, 15e, 15f).

That is, one end side of each of the driving beams 9a and 9b is commonly connected to the support unit 7a, one end side of each of the driving beams 9c and 9d is commonly connected to the support beam 7b, and the other end side of each of the driving beams 9a, 9b, 9c, and 9d is commonly connected to the outer frame 10.

This outer frame 10, as described later, can vibrate in an X direction shown in FIG. 4. The comb-shaped driving moveable electrode units 11 are each provided in the outer frame 10 so as to be interdigitated with and spaced from the corresponding comb-shaped driving fixed electrode units 11. Pairs of the driving fixed electrode units 5a, 5b, 5c, and 5d and the driving moveable electrode units 11a, 11b, 11c, and 11d that correspondingly face each other constitute a first driving unit (driving unit), and pairs of the driving fixed electrode units 5e, 5f, 5g, and 5h and the driving moveable units 11e, 11f, 11g, and 11h constitute a second driving unit (driving unit).

The support units 12a and 12b are each formed in the outer frame 10 so as to extend towards the inside of the outer frame 10. Furthermore, the detecting beams 13a and 13b are each formed so as to extend from the end side of the support unit 12a while the detecting beams 13c and 13d are each formed so as to extend from the support beam 12b.

The inner frame 14 is commonly connected to the extended edge side of each of the detecting beams 13a, 13b, 13c, and 13d. This inner frame 14 can vibrate integrally with the outer frame 10 in the X direction, as described below, and can also vibrate in a Y direction with respect to the outer frame 10. The comb-shaped detecting moveable electrode units 15 are each provided in the inner frame 14 so as to be interdigitated with and spaced from the corresponding comb-shaped detecting fixed electrode units 6. Pairs of the detecting fixed electrode units 6a, 6b, and 6c and the detecting moveable electrode units 15a, 15b, and 15c that correspondingly face each other constitute a first detecting unit (vibration detecting unit in the Coriolis force direction). Pairs of the detecting fixed electrodes 6d, 6e, and 6f and the detecting moveable electrode units 15d, 15e, and 15f constitute a second detecting unit (vibration detecting unit in the Coriolis force direction). Among a plurality of pairs of the detecting fixed electrode units 6 and the detecting moveable electrode units 15 that constitute the first and second detecting units, the pair of the detecting fixed electrode unit 6c and the detecting moveable electrode unit 15c and the pair of the detecting fixed electrode unit 6f and the detecting moveable electrode unit 15f constitute a driving monitoring unit.

A conductor pattern for supplying electric power from the outside to each of the driving fixed electrode units 5 and a conductive pattern for conductively connecting to each of the detecting fixed electrode units 6 are formed though they are not shown.

The vibrator 2 shown in FIG. 4 is constructed in the above-described manner. In this vibrator 2, when an alternating driving voltage (driving signal) is applied between the driving fixed electrode units 5 and the driving moveable electrode units 11 that face each other, making use of elasticity of each of the driving beams 9, the vibrator 8 vibrates (i.e., drive-vibrates) in the X-direction shown in FIG. 4, in which the support units 7a and 7b are caused to serve as fulcrums, in accordance with changes in the magnitude of electrostatic force based on the driving voltage.

In a state in which the overall vibrating body 8 is vibrated in the X direction in this manner, when the vibrating body 8 rotates about an axis in the Z direction (in the direction perpendicular to the drawing), the Coriolis force is generated in a direction, which is perpendicular to both the vibrating direction (X direction) of the vibrating body 8 and the center axis direction (Z direction) of rotation of the vibrating body 8, that is, the Coriolis force is generated in the Y direction. This Y-direction Coriolis force causes the inner frame 14 of the vibrating body 8 to vibrate (i.e., detect-vibrate) in the Y direction relatively to the outer frame 10, making use of the support units 12a and 12b as fulcrums and the elasticity of each of the detecting beams 13.

By detecting the change in the capacitance between the detecting fixed electrode units 6 and detecting moveable electrode units 15 based on this Y-direction detecting-vibration, the magnitude of the angular velocity around the Z axis can be detected.

Normally, in order to avoid adverse effects such as air damping, the vibrator 2 is contained in a housing space defined by, for example, a glass member and is sealed in a depressurized state. In this case, the driving fixed electrode units 5 and the detecting fixed electrode units 6 of the vibrator 2 are constructed so as to be conductively connectable to the outside via a through-hole disposed in, for example, the glass member.

In FIG. 5, one example of a signal processing circuit connected to the vibrator 2 is shown along with main parts of the vibrator 2. This signal processing circuit 20 is constructed by including a first detecting C-V converting unit 21, a second C-V converting unit 22, a summing amplifying unit 23, a differential amplifying unit 24, an AGC (Auto Gain Control) unit 25, a phase inverting unit 26, and a synchronous detecting unit 27. In FIG. 5, the driving fixed electrode units 5, the detecting fixed electrode units 6, the detecting movable electrode units 15 and the vibrating body 8 of the vibrator 2 are illustrated in a simplified manner so that the construction of the signal processing circuit can be easily described.

The first detecting C-V converting unit 21 has a construction for converting the total capacitance between the detecting fixed electrode units 6 (6a, 6b, 6c) and the detecting moveable electrode units 15 (15a, 15b, 15c), which constitute the first detecting unit of the vibrator 2, into a voltage and for outputting the converted signal. The second detecting C-V converting unit 22 has a construction for converting the total capacitance between the detecting fixed electrode units 6 (6d, 6e, 6f) and the detecting moveable electrode units 15 (15d, 15e, 15f), which constitute the second detecting unit, into a voltage and for outputting the converted signal.

When the vibrating body 8 vibrates only in the X-direction, the signal output from the first detecting C-V converting unit 21 is a signal A1 having a waveform indicated by, for example, a dot-dash line A1 in FIG. 6A. The signal output from the second detecting C-V converting unit 22 is a signal A2 having a waveform indicated by a dot-dash line A2 in FIG. 6B. The signal A2 has the same amplitude and phase as those of the signal A1 output from the first detecting C-V converting unit 21. The phases of the signals A1 and A2 caused by these driving-vibrations are displaced 90° from the phase of a driving signal applied between the driving fixed electrode units 5 and the driving moveable electrode units 11 for causing the vibrating body 8 to vibrate.

In the example shown in FIG. 4, the detecting fixed electrode unit 6a and the detecting fixed electrode unit 6b, the detecting moveable electrode unit 15a and the detecting moveable electrode unit 15b, the detecting fixed electrode unit 6d and the detecting fixed electrode unit 6e, and the detecting moveable electrode unit 15d and the detecting moveable electrode unit 15e have symmetric relationships, respectively. Hence, due to the driving vibration in the X direction, the change in the capacitance between the detecting fixed electrode unit 6a and the detecting moveable electrode unit 15a and the change in the capacitance between the detecting fixed electrode unit 6b and the detecting moveable electrode unit 15b are counterbalanced. Likewise, due to the vibration in the X direction, the change in the capacitance between the detecting fixed electrode unit 6d and the detecting moveable electrode unit 15d and the change in the capacitance between the detecting fixed electrode unit 6e and the detecting moveable electrode unit 15e are counterbalanced.

Because of this, when the vibrating body 8 driving-vibrates only in the X direction, the signal A1 output from the first detecting C-V converting unit 21 responds to the change in the capacitance only between the detecting fixed electrode unit 6c and the detecting moveable electrode unit 15c. The signal A2 output from the detecting C-V converting unit 22 responds to the change in the capacitance only between the detecting fixed electrode unit 6f and the detecting moveable electrode unit 15f. In other words, the vibration in the X-direction of the vibrating body 8 (driving direction) can be detected by the detecting fixed electrode units 6c and 6f and the detecting moveable electrode units 15c and 15f that constitute a driving monitoring unit.

When the inner frame 14 of the vibrating body 8 vibrates not only in the X direction but also in the Y-direction (Coriolis force direction) due to the angular velocity around the Z-axis shown in FIG. 4, the output signal from the first detecting C-V converting unit 21 is a signal obtained by overlapping the signal component A1 due to the driving vibration and a signal component B1 due to the angular velocity having the waveform indicated by a solid line B1. The signal component B1 has the magnitude of the amplitude in accordance with the magnitude of the angular velocity. The signal components A1 and B1 are 90° out of phase.

When the angular velocity is generated, the output signal from the second detecting C-V converting unit 22 is a signal obtained by overlapping the signal component A2 caused by the driving vibration and a signal component B2 caused by the angular velocity having the waveform indicated by a solid line B2 in FIG. 6B. The magnitude of the amplitude of the signal component B2 is in accordance with the magnitude of the angular velocity. In other words, the signal component B2 has substantially the same magnitude of amplitude as that of the signal component B1 of the output signal from the first detecting C-V converting unit 21. The phase of the signal component B2 is displaced by 90° from that of the signal component A2 and is displaced by 180° from that of the signal component B1 of the output signal from the first detecting C-V converting unit 21.

In addition, there is a case in which the inner frame 14 vibrates caused by not only the angular velocity but also the acceleration in the Y direction. In this case, the output signal from the first detecting C-V converting unit 21 becomes a signal obtained by overlapping the signal component A1 based on the driving vibration, the signal component B1 caused by the angular velocity, and a signal component C1 having the waveform indicated by a dashed line C1 in FIG. 6A due to the acceleration. The magnitude of the amplitude of the signal component C1 is in accordance with the magnitude of the acceleration and has the same phase as that of the signal component A1.

When the angular velocity and the acceleration are generated, the output signal from the second detecting C-V converting unit 22 becomes a signal obtained by overlapping the signal component A2 based on the driving vibration, the signal component B2 caused by the angular velocity, and a signal component C2 having the waveform indicated by a dashed line C2 in FIG. 4(b) due to the acceleration. The magnitude of the amplitude of the signal component C2 is in accordance with the magnitude of the acceleration. In other words, the magnitude of the amplitude of the signal component C2 has substantially the same magnitude as that of the amplitude of the signal component C1 of the output signal from the first detecting C-V converting unit 21. The phase of the signal component C2 is displaced from those of the signal component A2 and the signal component C1 by 180°.

In the above-described manner, the first detecting C-V converting unit 21 and the second detecting C-V converting unit 22 each output a signal in accordance with the vibration state of the vibrating body 8 to the summing amplifying unit 23 and the differential amplifying unit 24.

The summing amplifying unit 23 applies summing-amplifying to the output signal from the first detecting C-V converting unit 21 and the output signal from the second detecting C-V converting unit 22. Addition of the signal by this summing amplifying unit 23 causes the signal component B1 of the output signal from the first detecting C-V converting unit 21 caused by the angular velocity and the signal component B2 of the output signal from the second detecting C-V converting unit 22 to be counterbalanced and removed. Likewise, the signal component C1 and the signal component C2 caused by the acceleration are counterbalanced and removed. Because of this, the summing amplifying unit 23 outputs a signal in response to only a signal component, due to the driving vibration, obtained by adding the signal component A1 and the signal component A2 as a driving detecting signal (monitoring signal) to the AGC unit 25 and the synchronous detecting unit 27.

The AGC unit 25 outputs the driving signal as a positive feedback control so that the vibrating body 8 stably vibrates in the driving direction at the resonant frequency based on the driving-detecting signal. Among the pair of the driving fixed electrode units 5 (5a, 5b, 5c, 5d) and the driving moveable electrode units 11 (11a, 11b, 11c, 11d) that constitute the first driving unit and the driving fixed electrode units 5 (5e, 5f, 5g, 5h) and the driving moveable electrode units 11(11e, 11f, 11g, 11h) that constitute the second driving unit, the driving signal is applied directly into one of the driving units (the first driving unit in the example shown in FIG. 5) while the driving signal obtained by causing the phase inverting unit 26 to phase-invert the driving signal is applied to the other of the driving units. Application of this driving signal drives the vibrating body 8 into vibrating in the above-described manner. That is, in the vibrating body 8, positive feedback control is applied to each of the first and second driving units based on the vibrating state of the vibrating body 8 in the vibrating direction (X direction) detected by the driving monitor unit, so that the vibration stabilization of the vibrating body 8 in the driving direction thereof is achieved.

The differential amplifying unit 24 obtains the difference between the signal output from the first detecting C-V converting unit 21 and the signal output from the second detecting C-V converting unit 22. The differential of the signals of this differential amplifying unit 24 causes the signal component A1 due to the driving vibration in the output signal from the first detecting C-V converting unit 21 and the signal component A2 due to the driving vibration in the output signal from the second detecting C-V converting unit 22 to be counterbalanced. Because of this, the differential amplifying unit 24 outputs an angular velocity/acceleration mixed signal to the synchronous detecting unit 27 based on a signal component B3, indicated by a solid line B3 in FIG. 7, obtained by subtracting the signal component B1 from the 180° out of phase signal component B2 due to the angular velocity, which results in the signal component B1 being added to the signal component B2 and a signal component C3, indicated by a dashed line C3 in FIG. 7, obtained by subtracting the signal component C1 from the 180° out of phase signal component C2 due to the acceleration, which results in the signal component C1 being added to the signal component C2.

The synchronous detecting unit 27 is integrated with a phase shifter (not shown), which causes the phase of the driving detecting signal output from the summing amplifying unit 23 to be displaced by 90° to generate an angular velocity reference signal. The angular velocity/acceleration mixed signal output from the differential amplifying unit 24 is synchronously detected making use of this angular velocity reference signal.

That is, the angular velocity reference signal is a signal whose phase is equal to or is displaced by 180° from that of the angular velocity component B3 of the angular velocity/acceleration mixed signal. The synchronous detecting unit 27 integrates (synchronously detects) the angular velocity/acceleration mixed signal in a region D1 of the phase of the angular velocity reference signal of 0° to 180° and in a region D2 of the phase of the angular velocity reference signal of 180° to 360°. Since this synchronous detection removes the acceleration component C3 of the angular velocity/acceleration mixed signal, the synchronous detecting unit 27 outputs a signal in accordance with the angular velocity component B3 as the angular velocity signal. The magnitude of the angular velocity can be detected using this angular velocity signal.

In order that the outer frame 10 and the inner frame 14 of the vibrating body 8 ideally vibrate, the driving beams 9, the outer frame 10, the detecting beams 13, the inner frame 14, and the like that constitute the vibrating body 8 are preferably symmetric with respect to dashed lines A and B shown in FIG. 4. However, since, from the point of view of machining accuracy, it is substantially impossible to make the driving beams 9, the outer frame 10, the detecting beams 13, and the inner frame 14 in the above-described precisely symmetric manner, the driving beams 9, the outer frame 10, the detecting beams 13, and the inner frame 14 become asymmetric.

When the acceleration in a Y-direction is applied to the vibrating body 8, this asymmetry sometimes causes the vibrating body 8 to vibrate around, for example, an X-direction axis (i.e., to rotating-vibrate). When unwanted rotating-vibration is generated due to such acceleration, the capacitances between the detecting fixed electrode units 6c and 6f and the detecting moveable electrode units 15c and 15f that constitute the driving monitoring unit are changed due to not only driving-vibration of the vibrating body 8 caused by each of the first and second driving units, but also the influence of the unwanted rotating vibration caused by the acceleration. This leads to a state in which driving vibration signal components A1 and A2 of a signal output from the first C-V converting unit 21 and a second C-V converting unit 22 pick up noises caused by the acceleration.

Therefore, since the vibrating state of the vibrating body 8 in the driving direction cannot be accurately obtained, disturbance occurs in the positive feedback control of the driving vibration of the vibrating body 8, which causes a problem in that driving vibration of the vibrating body 8 becomes unstable. When the driving vibration of the vibrating body 8 becomes unstable, the synchronous detecting unit 27 does not correctly generate a synchronous detecting reference signal, which leads to a problem in that an accurate angular velocity signal cannot be output.

SUMMARY OF THE INVENTION

The present invention is directed to solving the foregoing problems, and the object thereof is to provide a vibrator capable of preventing disturbance in the vibration of the vibrating body in the driving direction caused by an unwanted rotating vibration.

A vibrator in a first aspect of the invention comprises: a vibrating body; a driving unit for causing the vibrating body to vibrate in a predetermined vibrating direction; and a driving monitoring unit provided in a barycentric region of the vibrating body for detecting vibration displacement, in a driving direction of the vibrating body.

As a result, stabilization of vibration in the driving direction of the vibrating body is achieved by applying positive feedback control to the driving unit based on the state of the vibration displacement in the driving direction of the vibrating body detected by this driving monitoring unit, wherein the driving monitoring unit has a construction so as to be provided in a barycentric region of the vibrating body and to detect the vibration displacement in the driving direction of the barycentric region of the vibrating body. This construction serves as unit for solving the problems.

A vibrator in a second aspect of the invention is provided with the construction of the first aspect of the invention and is characterized in that the vibrating body has a construction in which flexible vibration can be obtained in the driving direction thereof and in a Coriolis force direction that is substantially perpendicular to the driving direction. A Coriolis force direction vibrating detecting unit for detecting the vibration displacement in the Coriolis force direction of the vibrating body is provided, and the angular velocity of rotation around a central axis having a direction perpendicular to both the driving direction and the Coriolis force direction is found based on the vibration in the Coriolis force direction of the vibrating body detected by the Coriolis force direction vibrating detecting unit.

A vibrator in a third aspect of the invention is provided with the construction of the first or second aspect of the invention and is characterized in that the vibrating body has a double-frame construction obtained by connecting an inner frame to the inside of an outer frame via a coupling beam so that the vibrating body can flexibly vibrate in the Coriolis force direction. The driving unit causes the outer frame and the inner frame to vibrate in an integral manner in the driving direction, and the inner frame has a construction so as to be vibrated in the Coriolis force direction with respect to the outer frame due to the Coriolis force caused by the angular velocity. The driving monitoring unit is provided in the barycentric region of the vibrating body disposed inside the inner frame while being supported by the inner frame.

According to this invention, since the driving monitoring unit is provided in the barycentric region of a vibrating body for detecting vibration displacement in a driving direction of the vibrating body, in other words, since, when the vibrating body unnecessarily rotating-vibrates, the driving monitoring unit is provided in the barycentric region of the vibrating body, which is the central part of the unwanted rotating vibration and which has a small vibration displacement, even though unwanted rotating vibration occurs, the noise caused by the unwanted rotating vibration picked up in the signal output from the driving monitoring unit can be maintained at a low level.

This can prevent disturbance in the positive feedback control of the vibrating body due to the unwanted rotating vibration, so that the vibration in the driving direction of the vibrating body by driving unit can be stably continued.

When the vibrating body flexibly vibrating in the driving direction as well as in the Coriolis force direction is provided and the angular velocity is detected based on the vibration displacement in the Coriolis force direction of the vibrating body, since the vibration in the driving direction of the vibrating body due to the unwanted rotating vibration can be prevented from being unstable in the above-described manner, the angular velocity can be substantially accurately detected regardless of occurrence of the unwanted rotating vibration.

In the vibrating body having a double-frame construction, since the construction of the vibrating body is complicated, unwanted rotating vibration tends to occur. Even though such unwanted rotating vibration occurs, since, as described above, the vibration in the driving direction of the vibrating body can be stably continued by reducing the adverse effect due to the unwanted rotating vibration to a small amount, in a case in which the vibrating body has the double-frame construction, it is particularly effective that the driving monitoring unit is provided in the barycentric region of the vibrating body.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF THE PREFERRED EMBODIMENTS

The embodiments according to the present invention are described below with reference to the drawings.

Figure 1:
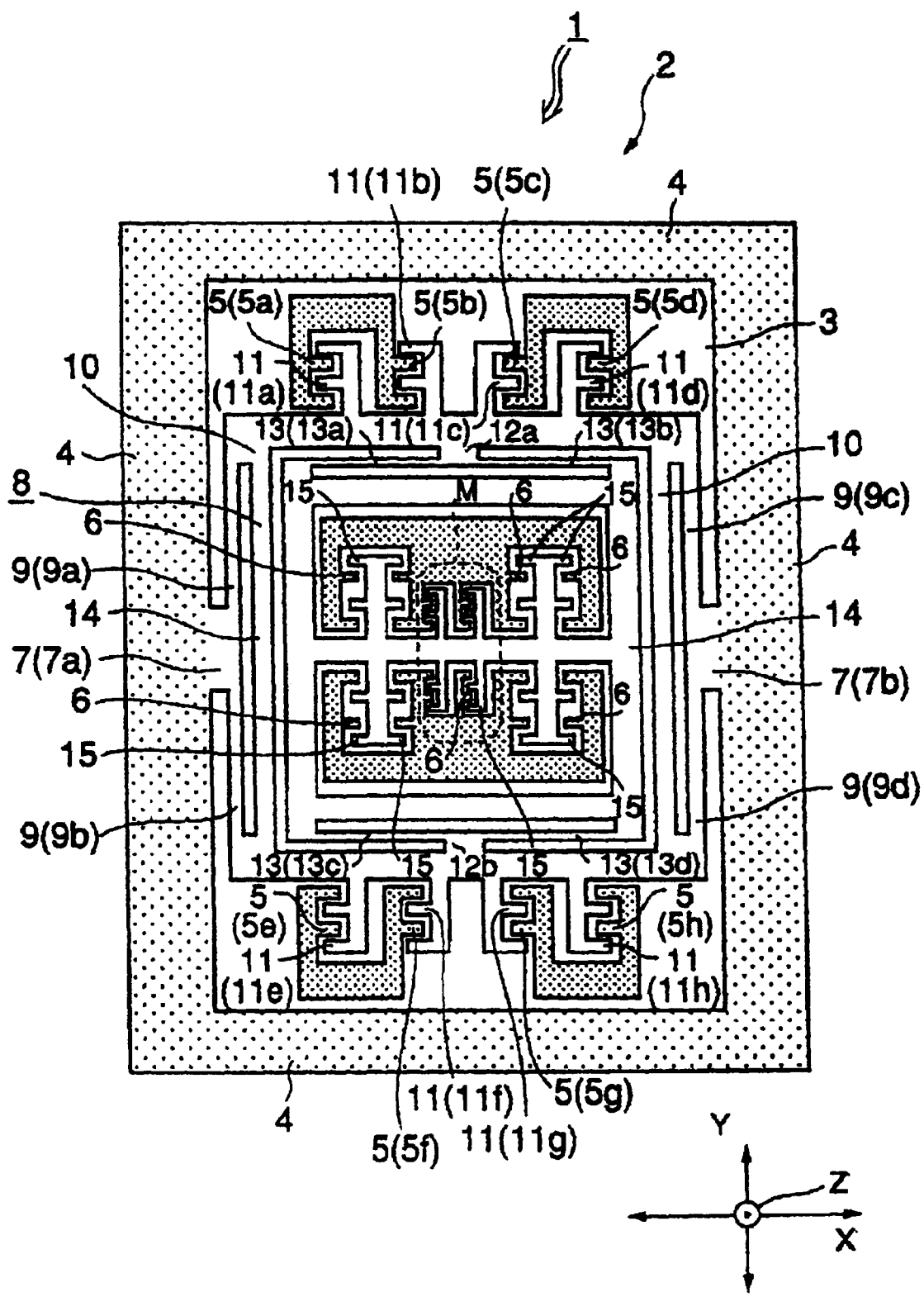
FIG. 1 is a plan view illustrating one embodiment of a vibrator according to the present invention.
Figure 4:
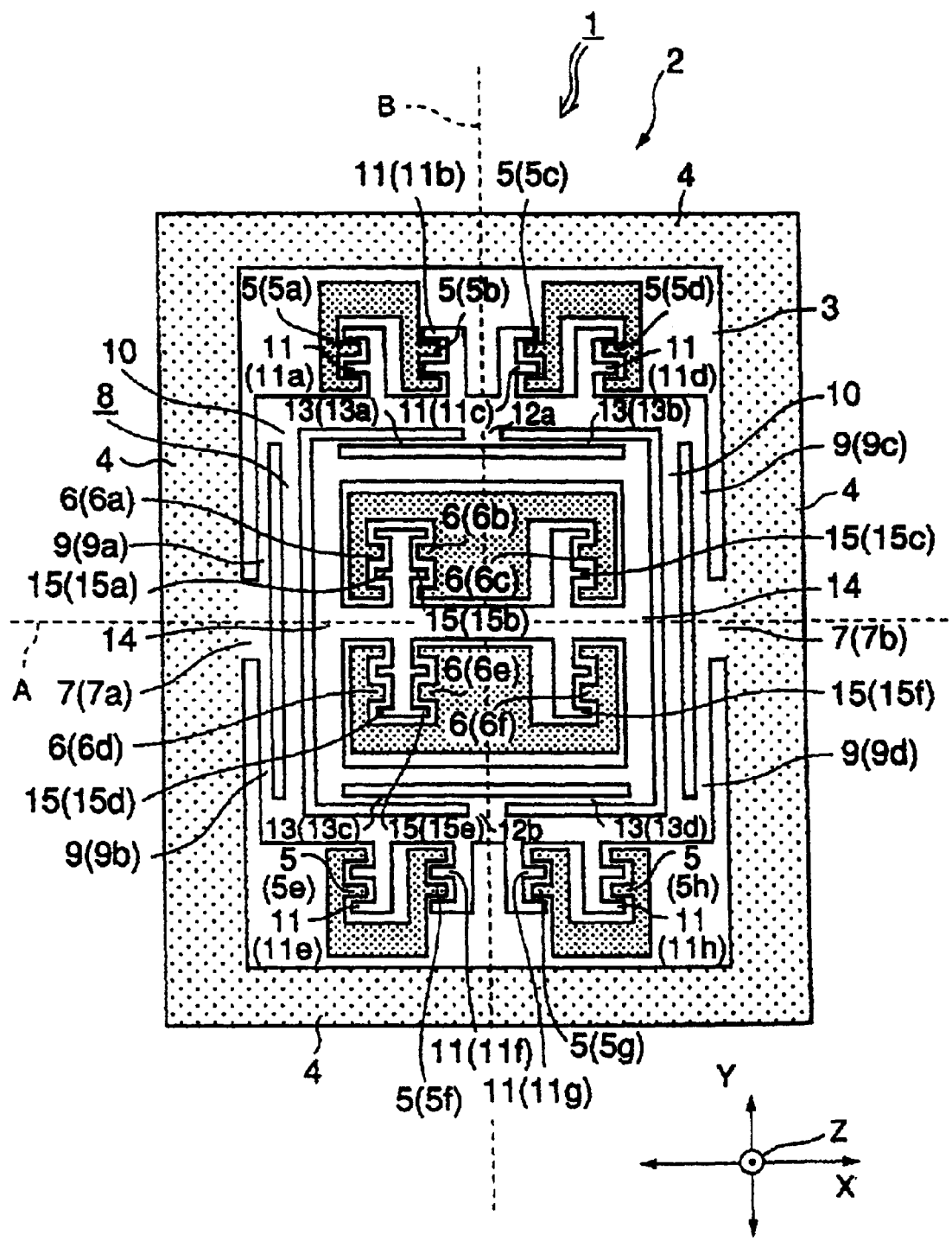
FIG. 4 is a plan view illustrating one example of a conventional vibrator.

FIG. 1 shows one embodiment of a vibrator according to the present invention. This present embodiment is characterized in that driving monitoring unit is provided in a barycentric region of a vibrating body. Otherwise, the construction of the vibrator is the same as that of the conventional example of FIG. 4. In the description of this embodiment, components that are identical to the corresponding components in the conventional example have the same reference numerals, whereby the repeated descriptions of the identical components are omitted.

In this embodiment, as shown in FIG. 1, comb-shaped detecting fixed electrode units 6 and detecting moveable electrode units 15 are provided in an opposed manner inside an inner frame 14 so as to be interdigitated with and spaced from each other to detect the vibration of the vibrating body 8 in the Coriolis force direction (the Y direction). Among these detecting fixed electrode units 6 and detecting moveable electrode units 15, the detecting fixed electrode units 6 and the detecting moveable electrode units 15 within a barycentric region surrounded by a dashed line M shown in FIG. 1 function as the driving monitoring unit for detecting vibration displacement in a driving direction (X direction) of the vibrating body 8.

As shown in FIG. 1, the driving monitoring unit is provided in the barycentric region M of the vibrating body 8 to detect the vibration displacement in the barycentric region M of the vibrating body 8 in the driving direction.

According to this embodiment, since the driving monitoring unit is provided in the barycentric region M of the vibrating body 8, when the unwanted rotating vibration of the vibrating body 8 occurs due to the application of the acceleration in the Y direction, the disturbance of the driving vibration of the vibrating body 8 caused by the unwanted rotating vibration can be avoided. That is, even though the vibrating body 8 unnecessarily experiences rotating vibration due to the above-described application of acceleration and asymmetry, since the center of the unwanted rotating vibration is located in the barycentric region of the vibrating body 8, the vibration displacement in the barycentric region M of the vibrating body 8 due to the unwanted rotating vibration is reduced to a small amount.

Therefore, even though the vibrating body 8 unnecessarily rotating-vibrates, by detecting the vibration displacement in the barycentric region M of the vibrating body 8 using the driving monitoring unit, the noise due to the above-described unwanted rotating vibration of the signal output from the driving monitoring unit becomes low.

As a result of this, normal positive feedback control is performed on the vibrating body 8, which is hardly influenced by the occurrence of the unwanted rotating vibration, so that the driving vibration stably continues. Because of this, accurate angular velocity can be obtained regardless of the application of the acceleration.

Figure 5:
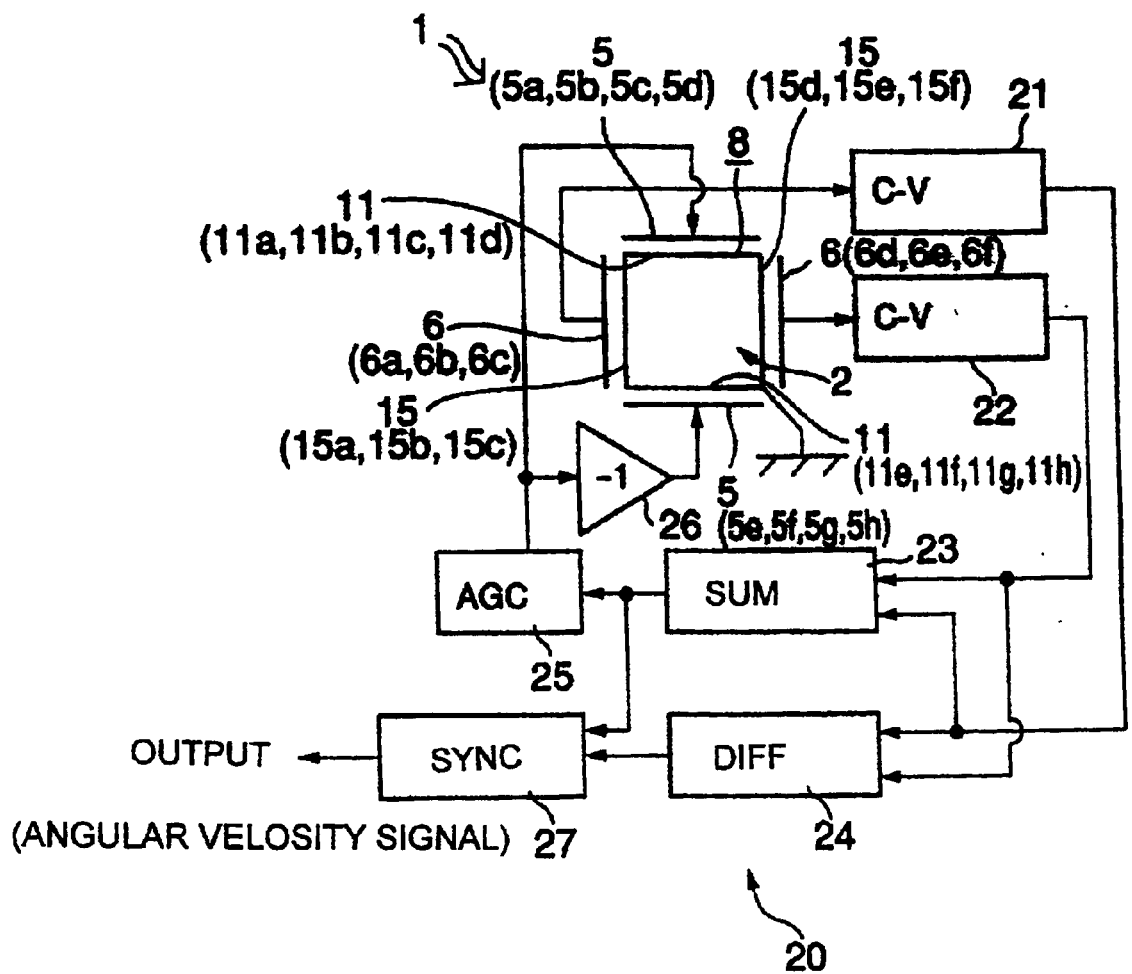
FIG. 5 is a block diagram schematically illustrating one example of a signal processing circuit for detecting the angular velocity with the vibrator of FIG. 1 or FIG. 4.
Figure 6A:
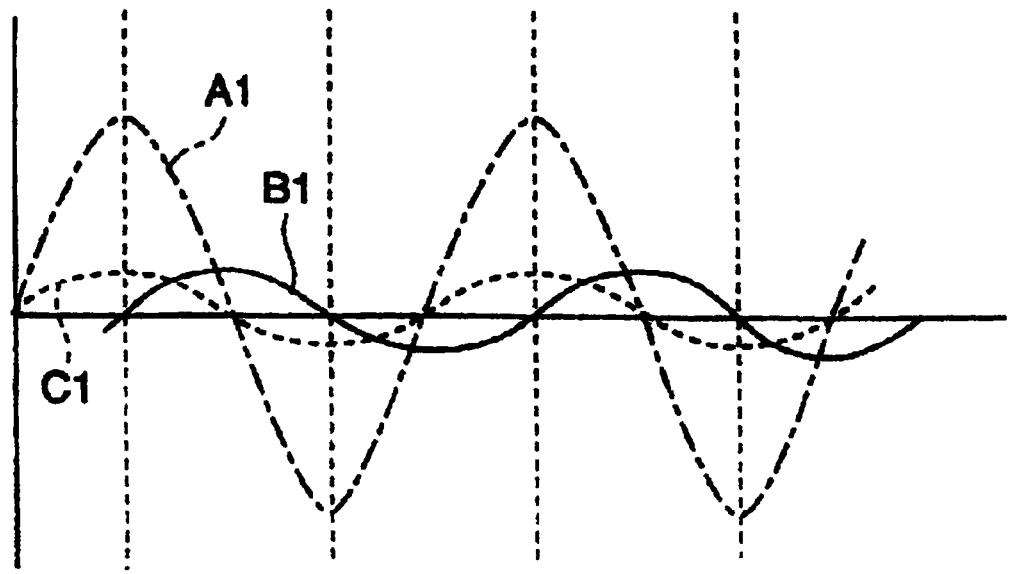
FIGS. 6A and 6B show waveform examples of signals output from a C-V converting unit shown in FIG. 5.
Figure 6B:
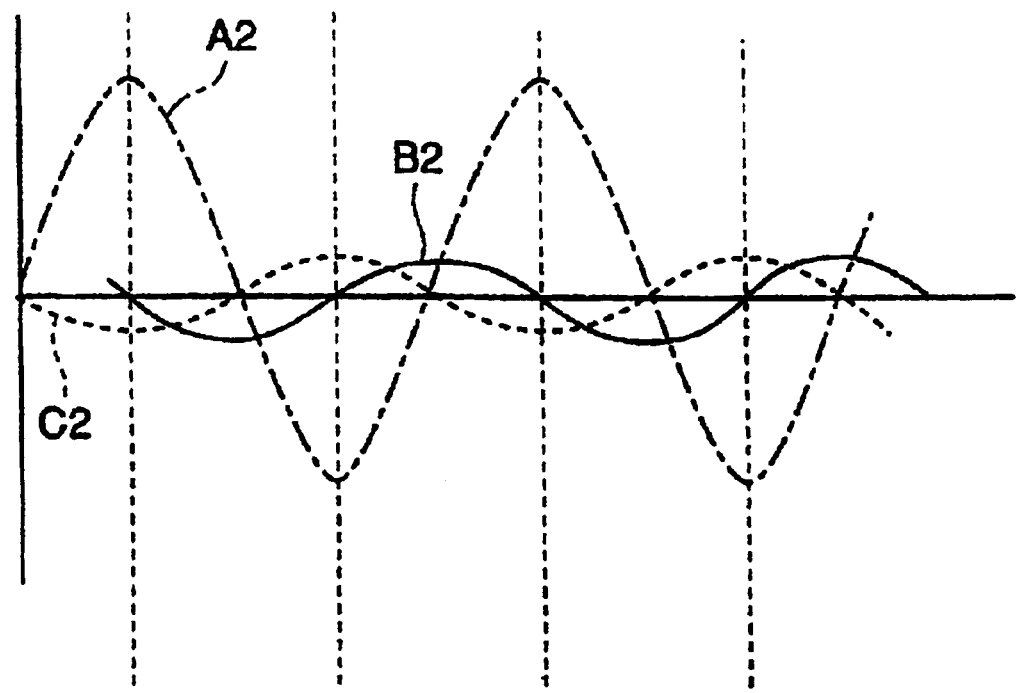
Figure 7:
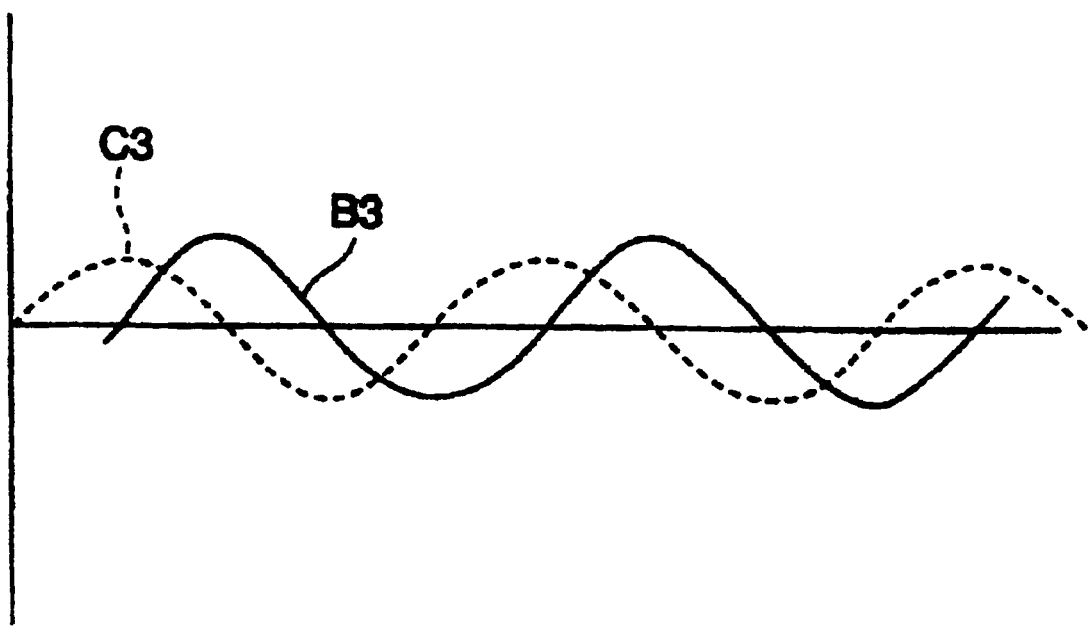
FIG. 7 is an illustration showing waveform examples of signals output from a differential amplifying unit shown in FIG. 5.

The inventors of the present invention confirmed this from an experiment. In this experiment, a vibrator provided with the driving monitoring unit disposed in a region that is off the barycentric region M of the vibrating body 8, as described in the conventional example of FIG. 4, was compared with a vibrator provided with the driving monitoring unit disposed in the barycentric region M of the vibrating body 8, as shown in this embodiment. The comparison examined how the levels of the signal components (noises) that are caused by the unwanted rotating vibration (acceleration application) contained in the output signals from the synchronous detecting unit 27 shown in FIG. 5 differed between the two vibrators. The results of the experiment are shown in FIG. 2.

Figure 2:
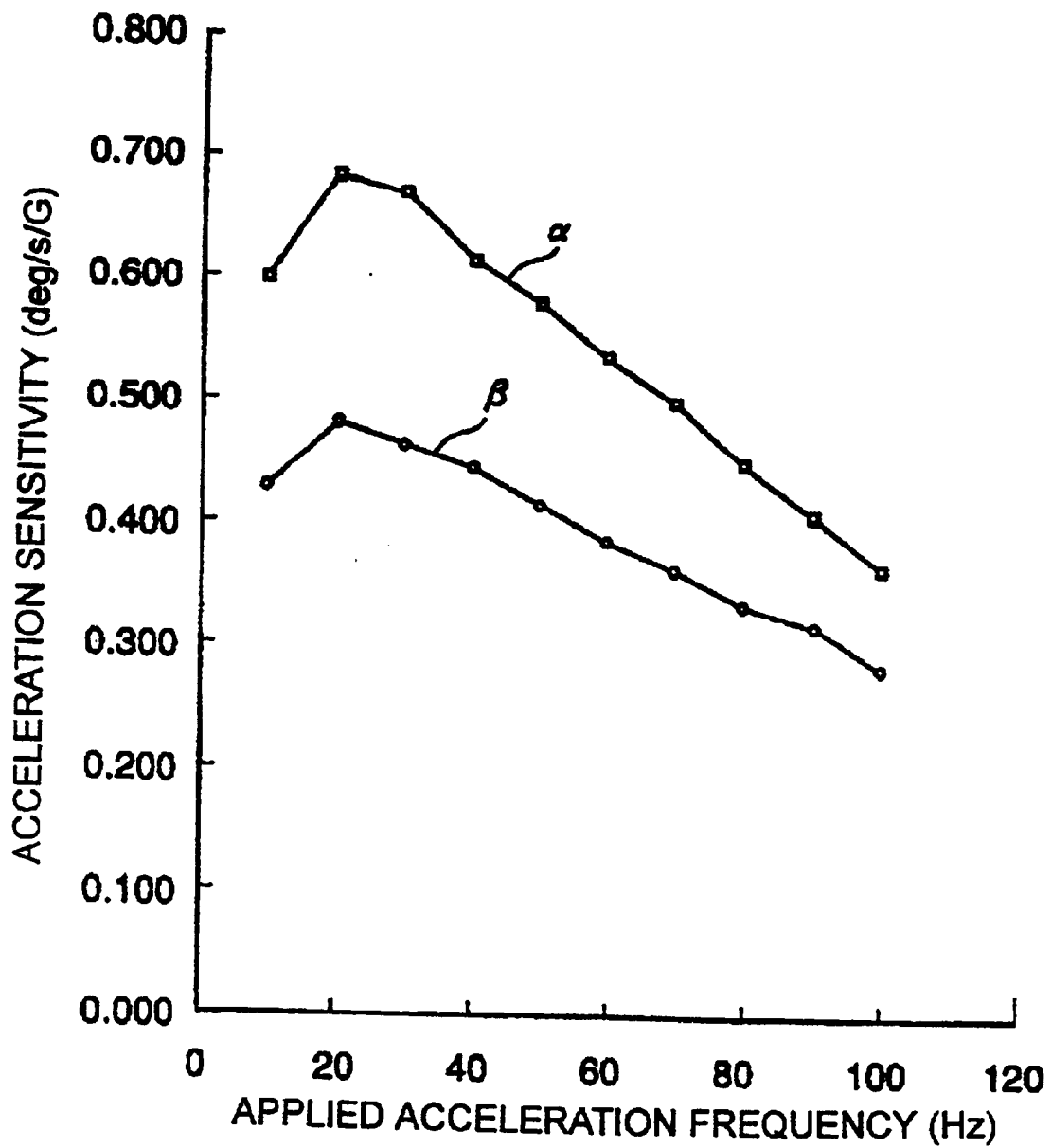
FIG. 2 is a graph showing the effect of this embodiment using experimental results.

In the graphs in this FIG. 2, the horizontal axis indicates the frequency of the acceleration applied to the vibrating body 8, and the longitudinal axis indicates the level (acceleration sensitivity) of the noise caused by the application of the acceleration. The solid line α indicates the experiment result obtained by using the conventional vibrator provided with the driving monitoring unit disposed in the region that is off the barycentric region of the vibrating body 8, and the solid line β indicates the experimental result obtained by using the vibrator according to the present embodiment provided with the driving monitoring unit disposed in the barycentric region M of the vibrating body 8.

FIG. 2 demonstrates that, by providing the driving monitoring unit in the barycentric region M of the vibrating body 8, as shown in this embodiment, the noise caused by the application of the acceleration can be considerably maintained at a low level compared to the conventional example.

As is shown in the above experimental results, by providing the construction in this embodiment, the noise caused by the application of the acceleration contained in the output signal from the synchronous detecting unit 27 can be maintained at a low level. Consequently, accurate angular velocity can be obtained.

This invention is not restricted to the above embodiment and can take various forms of embodiments. For example, in the above embodiment, though the vibrating body 8 has a double-frame construction constructed by connecting the inner frame 14 to the inside of the outer frame 10 via the coupling beams (detecting beams) 13, the present invention can be applied to the vibrator provided with the vibrating body having a construction other than the double-frame construction. For example, it can be applied to the vibrating body in the embodiment shown in FIG. 3.

Figure 3:
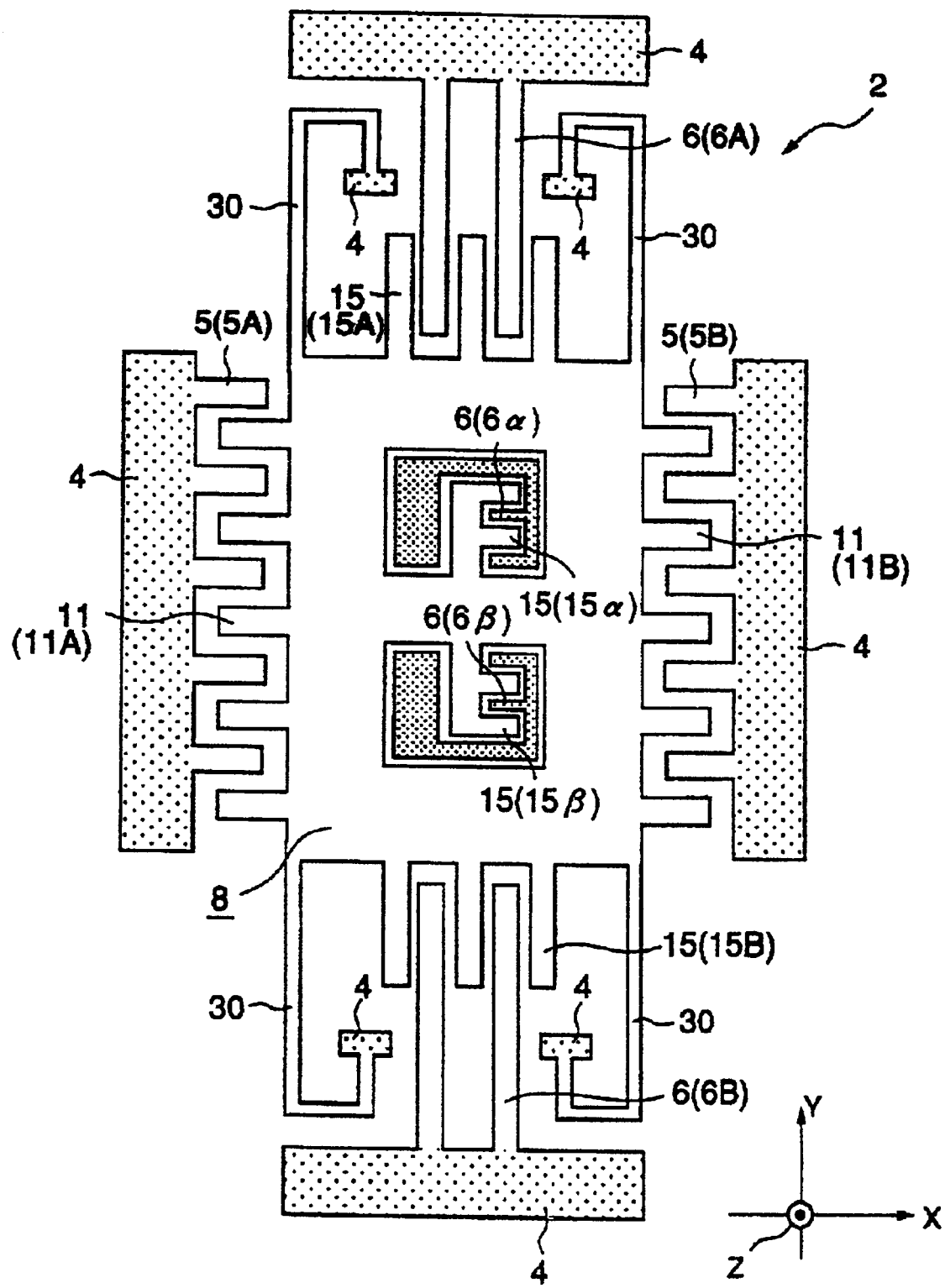
FIG. 3 is a plan view illustrating another embodiment.

In FIG. 3, components whose names are the same as in the above embodiment have the same reference numerals as in the above embodiment. The vibrator 2 shown in this FIG. 3 constitutes the angular velocity sensor in the same manner as in the above embodiment. The vibrating body 8 of the vibrator 2 is supported on a support fixed unit 4 using a support beam 30 formed by being folded into an U-shape and can vibrate in two directions, the X direction and the Y direction shown in FIG. 3. By applying an alternating signal to the comb-shaped driving fixed electrode units 5 (5A, 5B), this vibrating body 8 driving-vibrates in the X direction in FIG. 3 due to change in the capacitance between the driving fixed electrode units 5 (5A, 5B) and the driving moveable electrode units 11 (11A, 11B).

During such a driving-vibration, by rotating around the Z-axis, the vibrating body 8 vibrates in the Y direction in FIG. 3 due to the Coriolis force caused by the rotation. This vibration displacement is detected as the change in the capacitance between the detecting fixed electrode units 6 (6A, 6B, 6β, 6β) and the detecting moveable electrode units 15 (15A, 15B, 15α, 15β), so that the angular velocity of the rotation around the Z-axis can be detected. In the example shown in this FIG. 3, pairs of the detecting fixed electrode units 6α and 6β and the detecting moveable electrode units 15α and 15β function as the driving monitoring unit. The positive feedback control is performed on the vibrating body 8 based on the vibrating state in the driving direction of the vibrating body 8 detected by this driving monitoring unit.

This driving monitoring unit is provided in the barycentric region of the vibrating body 8 in the same manner as in the first embodiment. This can prevent the disturbance in the driving vibration of the vibrating body 8 due to the acceleration application in the same manner as in the first embodiment. Even though the vibrating body 8 unnecessarily rotating-vibrates due to the acceleration application, the angular velocity can be substantially accurately detected.

In the above embodiments, although the description is made using the example of the vibrator embedded in the angular velocity sensor, this invention can be applied to the vibrator constituting a filter or the like.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrator comprising:
    a vibrating body;
    a driving unit for causing said vibrating body to vibrate in a predetermined vibrating direction; and
    a driving monitoring unit provided in a barycentric region of said vibrating body for detecting vibration displacement in a driving direction of said vibrating body.

2. A vibrator according to claim 1, wherein said vibrating body vibrates in the driving direction thereof and in a Coriolis force direction that is substantially perpendicular to said driving direction when a Coriolis force is applied to said vibrating body, and further comprising a Coriolis force direction vibrating detecting unit for detecting vibration displacement in the Coriolis force direction of said vibrating body.

3. A vibrator according to claim 2, wherein said vibrating body has a double-frame construction obtained by connecting an inner frame to the inside of an outer frame via a coupling beam so that said vibrating body can flexibly vibrate in the Coriolis force direction, and said driving unit causes said outer frame and said inner frame to vibrate in an integral manner in the driving direction, said inner frame being constructed and arranged so as to be vibrated in the Coriolis force direction with respect to said outer frame due to the Coriolis force caused by an angular velocity, and said driving monitoring unit being provided in the barycentric region of said vibrating body disposed inside said inner frame while being supported by said inner frame.

4. A vibrator according to claim 3, in which said Coriolis force is caused by an angular velocity of rotation around an axis having a direction perpendicular to both said driving direction and said Coriolis direction and further comprising a circuit responsive to said Coriolis force direction vibrating detecting unit for determining said angular velocity of rotation.

5. A vibrator according to claim 1, the vibrator further includes a plurality of comb-shaped fixed electrodes; and the driving monitoring unit includes a plurality of comb-shaped movable electrodes disposed in the barycentric region of the vibrating body; wherein each of the plurality of comb-shaped movable electrodes and each of the plurality of comb-shaped fixed electrodes include a plurality of tines;

the plurality of tines of each of the plurality of comb-shaped movable electrodes extend only in one direction and the plurality of tines of each of the plurality of comb-shaped fixed electrodes extend only in a direction that is opposite to the one direction; and the plurality of tines of each of the plurality of comb-shaped movable electrodes engage the plurality of tines of a corresponding one of the plurality of comb-shaped fixed electrodes such that the vibration displacement in the driving direction of the vibrating body is detected.

* * * * *